2,793,284

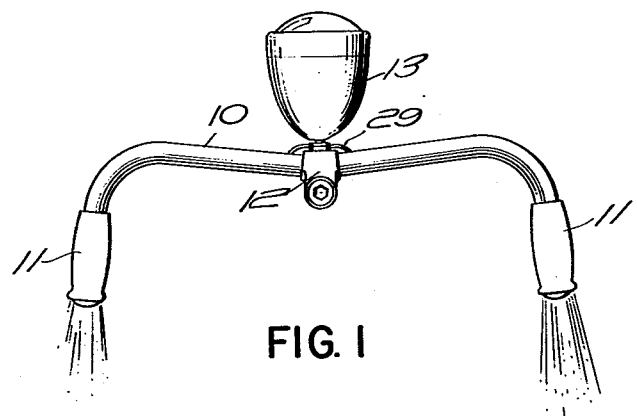
FIG. 1
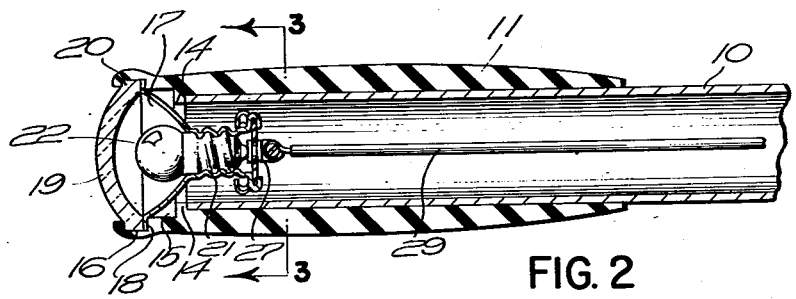
FIG. 2
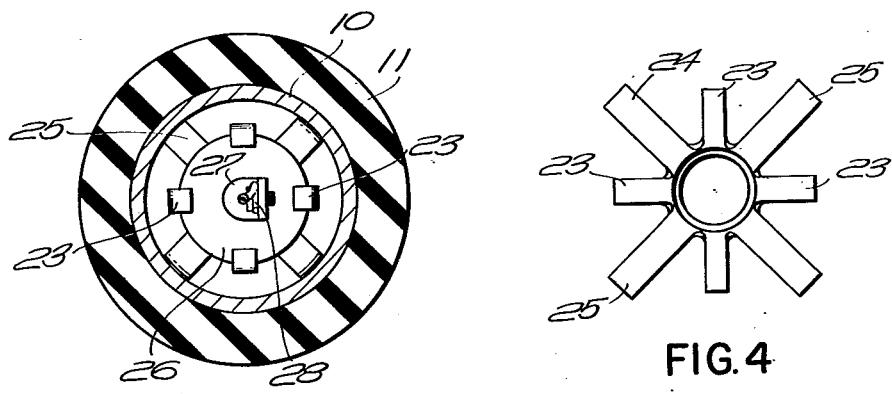
FIG. 3
FIG. 4
INVENTOR.
KURT SIMONEIT 2,793,284
Patented May 21, 1957

BICYCLE SAFETY LIGHTS

Kurt Simoneit, East Greenwich, R. I., assignor to William F. Sullivan, Lenox, Mass.

Application June 7, 1954, Serial No. 434,770

4 Claims. (Cl. 240—7.55)

My present invention relates to a bicycle accessory and more particularly to a pair of safety lights.

The principal object of the present invention is to provide a pair of safety lights positioned in the hand grips of a bicycle handle bar.

Another object of the present invention is to provide additional rear view safety lights which outline the width of the bicycle.

A further object of the present invention is to provide a set of rear view safety lights which can easily be installed in standard bicycle constructions.

Another object of the present invention is to provide a bicycle safety light which is simple in construction and easy and economical to manufacture and assemble.

With the above and other objects and advantageous features in view, my invention consists of a novel arrangement of parts, more fully disclosed in the detailed description following, in conjunction with the accompanying drawings, and more particularly defined in the appended claims.

In the drawings:

Fig. 1 is a top plan view of a bicycle handle bar embodying my invention.

Fig. 2 is an enlarged longitudinal section through one of the hand grips.

Fig. 3 is a section taken on line 3—3 on Fig. 2.

Fig. 4 is an end view of the contact members prior to assembly.

Riding a bicycle after dark is dangerous. Because of this most communities have laws which require that the bicycle be equipped with a headlight and a taillight. However, a small red light at the rear of the bicycle is often difficult to see from a fast moving vehicle. The present invention is designed to provide additional safety lights which will outline the width of the bicycle. The lights of the present invention are simple in construction and can readily be installed in the handle bar of the bicycle.

Referring more in detail to the drawings illustrating my invention, Fig. 1 shows its application to a conventional bicycle handle bar 10 having rubber hand grips 11. The handle bar 10 is usually clamped to the steering post, as at 12, and the bicycle may be equipped with a standard headlight 13. Electrical current may be provided by batteries, generators, or any other conventional means (not shown).

The safety lights of the present invention are set into the ends of the handle bar, beneath the hand grips, as shown in Figs. 2 and 3. The hand grip 11 is made of rubber or soft plastic material and the outer end extends beyond the end of the tubular handle bar 10. Internally, the body portion of each hand grip 11 fits tightly around the handle bar 10 and is provided with a shoulder 14 which abuts the end of the handle bar and limits inward movement of the hand grip 11. Towards its outer end, each hand grip 11 is provided with a portion 15 of wider diameter and an internal annular transverse groove 16 adjacent the outer end.

The electrical assembly is shown in Figs. 2, 3 and 4. A tubular piece of metallic stock is flared at its front end to form a reflector 17 having a flange 18 which enters the inner edge of the groove 16. The lens 19 may be clear or colored and is provided with a flange 20 which fills up the rest of the groove 16 and holds the flange 18 in place. If the flanges 18 and 20 are made oversize with respect to the diameter of the groove 16, the rubber will be slightly stretched and will resiliently grip the lens 19 and the reflector 17.

Integrally formed with the reflector 17 is a threaded portion 21 adapted to receive a standard light bulb 22. The inner end of the portion 21 terminates in four (4) narrow strips 23 which are normally bent at right angles to the body portion as shown in Fig. 4. I now provide a blank 24 having a large central opening and four (4) wide strips 25 extending radially as shown in Fig. 4. In assembly an insulating plate or washer 26 is placed over the blank 24 and the short arms 23 are bent over into the position shown in Fig. 3 to lock the plate to the assembly. This also locks the blank 24 between the plate and the portion 21. The outer ends of the arms 25 are then bent over into a U-bend shortening the arms so that they will resiliently fit within the handle bar 10 touching the inner surface as shown in Fig. 3. This forms a continuous contact from the threaded portion of the bulb 22, through the threaded portion 21, through the blank 24 and arms 25, to the handle bar 10.

The other electrical contact comprises an L-shaped member 27 which is mounted in the center of the plate 26. One end extends through the plate 26 to make contact with the center contact pin at the bottom of the bulb 22 as shown in Fig. 2. The other arm of the member 27 is provided with a binding post 28 to which the end of the insulated cord 29 is attached. The cord 29 runs through the handle bar 10 and can be attached to the head lamp 13 as shown in Fig. 1 or can be extended directly to the source of supply of electric current. Since the frame of the bicycle is used as a ground connection, only one wire need be run to the light.

With the above assembly a light is positioned in the handle bar grips and shining rearwardly from spaced points which outline the width of the bicycle. These lights can be red or any other desired color. The construction is simple and the parts readily assembled and installed. The bulb can easily be reached for changing. Because of the position of the lights they are free of dirt and atmospheric influences, making them visible at all times.

Other advantages of the present invention are readily apparent to a person skilled in the art.

I claim:

1. A safety light for a bicycle having a tubular handlebar comprising a tubular hand grip of resilient material over one end of said handle bar, the outer end of said hand grip being open and extending beyond the end of the handle bar, a lens mounted adjacent the outer end of said hand grip, a light reflector mounted in said hand grip, means mounted in said tubular handle bar for retaining a light bulb in said reflector and for making an electrical contact with said handle bar, and an electrical cord lead extending through said handle bar to said retaining means for completing the electrical circuit to said bulb, said retaining means including a tubular socket portion having one end integral with said reflector, the other end of said socket portion having a plurality of strips extending integrally therefrom, a stamped blank having a central opening and a plurality of radial strips contacting the inner surface of said handle bar, and a dielectric disc in contact with the side of said blank furthest from said lens locking said blank to the end of said socket, said socket strips being bent over the edge of said disc to lock the parts together.

2. A safety light for a bicycle having a tubular handlebar comprising a tubular hand grip of resilient material over one end of said handle bar, the outer end of said hand grip being open and extending beyond the end of the handle bar, a lens mounted adjacent the outer end of said hand grip, a light reflector mounted in said hand grip, means mounted in said tubular handle bar for retaining a light bulb in said reflector and for making an electrical contact with said handle bar, and an electrical cord lead extending through said handle bar to said retaining means for completing the electrical circuit to said bulb, said retaining means including a tubular socket portion having one end integral with said reflector, the other end of said socket portion having a plurality of strips extending integrally therefrom, a stamped blank having a central opening and a plurality of radial strips contacting the inner surface of said handle bar, and a dielectric disc in contact with the side of said blank furthest from said lens locking said blank to the end of said socket, said socket strips being bent over the edge of said disc to lock the parts together, said hand grips each having an internal groove adjacent the outer end, said reflector and said lens being anchored in said groove.

3. A safety light for a bicycle having a tubular handlebar comprising a tubular hand grip of resilient material over one end of said handle bar, the outer end of said hand grip being open and extending beyond the end of the handle bar, a lens mounted adjacent the outer end of said hand grip, a light reflector mounted in said hand grip, means mounted in said tubular handle bar for retaining a light bulb in said reflector and for making an electrical contact with said handle bar, and an electrical cord lead extending through said handle bar to said retaining means for completing the electrical circuit to said bulb, said retaining means including a tubular socket portion having one end integral with said reflector, the other end of said socket portion having a plurality of strips extending integrally therefrom, a stamped blank having a central opening and a plurality of radial strips contacting the inner surface of said handle bar, and a dielectric disc in contact with the side of said blank furthest from said lens locking said blank to the end of said socket, said socket strips being bent over the edge of said disc to lock the parts together, and a contact post mounted on said disc and having one end contacting the lower end of the light bulb and the other end having a binding post for the electrical cord connection.

4. A safety light for a bicycle having a tubular handlebar comprising a tubular hand grip of resilient material over one end of said handle bar, the outer end of said hand grip being open and extending beyond the end of the handle bar, a lens mounted adjacent the outer end of said hand grip, a light reflector mounted in said hand grip, means mounted in said tubular handle bar for retaining a light bulb in said reflector and for making an electrical contact with said handle bar, and an electrical cord lead extending through said handle bar to said retaining means for completing the electrical circuit to said bulb, said retaining means including a tubular socket portion having one end integral with said reflector, the other end of said socket portion having a plurality of strips extending integrally therefrom, a stamped blank having a central opening and a plurality of radial strips contacting the inner surface of said handle bar, and a dielectric disc in contact with the side of said blank furthest from said lens locking said blank to the end of said socket, said socket strips being bent over the edge of said disc to lock the parts together, and a contact post mounted on said disc and having one end contacting the lower end of the light bulb and the other end having a binding post for the electrical cord connection, said hand grip having an internal groove adjacent the outer end, said reflector and said lens being anchored in said groove.

References Cited in the file of this patent
UNITED STATES PATENTS

| | | |
|---|---|---|
| 1,932,265 | Douglas | Oct. 24, 1933 |
| 2,001,363 | Joers | May 14, 1935 |
| 2,143,558 | Joers | Jan. 10, 1939 |
| 2,469,944 | Bauters | May 10, 1949 |
| 2,603,701 | Schadel | July 15, 1952 |